| United States Patent [19] | [11] Patent Number: 5,021,469 |
|---|---|
| Langerbeins et al. | [45] Date of Patent: Jun. 4, 1991 |

[54] BINDER FOR AQUEOUS GLOSS PAINTS

[75] Inventors: Klaus Langerbeins, Langen; Wolfgang Klesse, Mainz; Dieter Tessmer, Ruesselheim; Wilhelm Elser, Griesheim; Hans-Juergen Geyer, Muehltal, all of Fed. Rep. of Germany

[73] Assignee: Röhm GmbH, Darmstadt, Fed. Rep. of Germany

[21] Appl. No.: 468,600

[22] Filed: Jan. 23, 1990

[30] Foreign Application Priority Data

Jan. 25, 1989 [DE] Fed. Rep. of Germany ....... 3902103

[51] Int. Cl.$^5$ .......................................... C08F 263/02
[52] U.S. Cl. .................................... 523/201; 525/301; 525/902
[58] Field of Search ................. 523/201; 525/301, 902

[56] References Cited

U.S. PATENT DOCUMENTS

| 4,002,801 | 1/1977 | Knechtges et al. ................. 523/201 |
| 4,107,120 | 8/1978 | Plamondon et al. ................ 523/201 |
| 4,171,407 | 10/1979 | Elser et al. .......................... 428/500 |
| 4,654,397 | 3/1987 | Mueller-Mall et al. ............. 524/460 |

FOREIGN PATENT DOCUMENTS 3443964 6/1986 Fed. Rep. of Germany .

Primary Examiner—Joseph L. Schofer
Assistant Examiner—Jeffrey T. Smith
Attorney, Agent, or Firm—Curtis, Morris & Safford

[57] ABSTRACT

The inventive vehicle, or binder, for water based gloss paints contains, dispersed in a aqueous phase, particles of a multiphase emulsion polymer made up of
  (a) core material having a glass transition temperature exceeding 40° C. and
  (b) a shell material having a glass transition temperature of less than 70° C. and at least 20 K. below that of the core material.

The particles have an average diameter of less than 200 nm. The composition of the shell material includes an emulsion polymer with at least 4 percent by weight of an ethylenically unsaturated carboxylic acid and more than 80 percent by weight of one or more monomers from the group consisting of styrene and alkyl esters of acrylic and/or methacrylic acid. Paint coats produced with this vehicle are distinguished by a high blocking point.

5 Claims, No Drawings

BINDER FOR AQUEOUS GLOSS PAINTS

The present invention relates to binders, i.e. vehicles, for water based gloss paints having a low minimum film-forming temperature, a high blocking point, and good flow properties and which contain particles of a multiphase emulsion polymer dispersed in an aqueous phase.

THE PRIOR ART

Vehicles for pigmented paints giving coatings with a high blocking point and varying degrees of gloss are known from German patent publication 26 59 133. They are produced by emulsion polymerization of acrylic esters in the presence of converted starch.

From German patent 34 43 964, vehicles for paints are known which contain, dispersed in an aqueous phase, particles of a multiphase emulsion polymer built up from a hard core material and a soft shell material. The core material contains units of a carboxylic acid monomer. The composition of the shell material may include comonomers with ureido groups. The gloss and flow of coats of paint produced with these vehicles are not satisfactory.

THE OBJECT AND THE INVENTION

The invention has as its object to provide a vehicle for water based gloss paints which imparts good flow properties, a low minimum film-forming temperature, and good stability to agitation to paints manufactured with it. Such a vehicle should also impart a high blocking point, high gloss, and good adhesion to coats incorporating an alkyd resin as a binder, to coats of paint produced with it.

This object is accomplished by the vehicle described in the present application. It has been found that the required properties can be obtained with a multiphase emulsion polymer if the latex particles of the emulsion polymer are of small size, the core material is hard and the shell material is soft, and the latter is made up largely of strongly hydrophobic monomers and a relatively large proportion of monomers carrying carboxyl groups. It has further been found that excellent adhesion to old alkyd based coats is secured also in the presence of carboxylic acid groups by the specific inclusion in the shell material of nitrogen-containing adhesive monomers.

PRACTICE OF THE INVENTION

The essential constituent of the vehicle of the invention is the multiphase emulsion polymer. It is produced by multistage emulsion polymerization in the aqueous phase, the polymer produced in the first stage being referred to as the core, and the polymer produced in the succeeding stages as the shell material.

"Phase" here means an emulsion polymer which is produced in a time interval of limited duration during the multistage emulsion polymerization and whose composition differs from that of the preceding or succeeding phase. This is also referred to as multistage emulsion polymerization or graft polymerization. The phases may form in each latex particle a spherical core and one or more shells surrounding the core, but such a structure has neither been established nor is it actually required for the emulsion polymer of the invention. However, it is assumed that the phases in any case form domains which are physically separated from but touch one another.

The particles are formed in the first stage and in the succeeding stages continue to grow to their final size. On completion of the first stage, few if any new particles are usually formed.

The average diameter of the particles is controlled conventionally through the number of latex particles formed. As a rule, all particles are already formed at the start of the first stage. The concentration of the emulsifier in the initial phase of the emulsion polymerization thus has a decisive influence on the number of particles, and hence on the particle size. As soon as the originally formed latex particles begin to grow, they adsorb the available emulsifier at their rapidly growing surface, so that no new growth nuclei are formed. As a rule, more emulsifier is added in the course of the emulsion polymerization to cover the newly formed polymer surface adequately with emulsifier. However, the free emulsifier concentration should not be allowed to rise above the critical micelle concentration at any time after the particle formation phase. The available monomer or monomer mixture is then utilized solely for the growth of the original nuclei.

The ratio of the water phase to the total quantity of the monomers used in both stages is chosen on the basis of the desired solids content of the resin dispersion being produced. The solids content usually is between 30 and 60 percent by weight. The monomer or monomer mixture for the formation of the first stage can be charged to the polymerization kettle all at once at the outset or metered in, partially or in its entirety, during the first stage as an aqueous emulsion. After its polymerization, the monomer or monomer mixture for the second stage is added either all at once or gradually and likewise polymerized. A third stage may follow in the same way. The polymerization is initiated in all stages through commonly used free-radical initiators, such as an alkali-metal persulfate or ammonium persulfate, azobisisobutyronitrile, 4, 4'-azobiscyanovaleric acid, tert-butyl peroxypivalate or tert-butyl hydroperoxide. For formation of a redox system, reducing compounds such as sodium metabisulfite, sodium hydroxymethylsulfinate or ascorbic acid may be used together with the peroxidic initiators, optionally in combination with heavy-metal salts such as ferrous sulfate. The polymerization temperature usually ranges from 20° to 90° C. and is maintained by cooling the batch.

Suitable for use as emulsifiers are the usual water-soluble anionic, cationic or nonionic emulsifiers.

Since the resin dispersion of the invention contains very small particles, a large number of nuclei must be formed and an appropriately high emulsifier concentration maintained in the initial phase. The proper amount of emulsifier is determined for the particular polymerization system by trial and error, starting with a likely amount of emulsifier, for example, 0.5 percent by weight, based on the water phase, and then increasing or reducing the amount of emulsifier if the particles formed are too large or too small. Measures which can be taken to influence the particle size are known to those skilled in the art. (See, for example, Sütterlin, Kurth and Markert in "Makromolekulare Chemie", 177 (1976), pp. 1549–1565.)

"Average particle diameter" here means the weight average of the particle diameter. It can be determined by known methods, for example, by nephelometry. A particularly well-suited method is photon correlation spectroscopy. The particle size should be less than 200 nm, and preferably less than 170 nm, and more particularly less than 140 nm. The best results have been obtained in the range from 80 to 120 nm.

Composition of core and shell materials

The core material, formed in the first polymerization stage, is characterized by a glass transition temperature of over 40° C. and preferably between 90° and 150° C. The core material is composed predominantly of hardness-imparting monomers, meaning monomers whose homopolymers have a glass transition temperature of at least 80° C., for example, styrene, alpha-methylstyrene, acrylonitrile and methacrylonitrile, methyl, ethyl, isopropyl, sec-butyl and cyclohexyl methacrylate, or vinyl chloride. Crosslinking comonomers having two or more, for example, from two to six, polymerizable carbon double bonds per molecule, such as vinyl or allyl acrylate or methacrylate, diol diacrylates and methacrylates, and methylene-bis-acrylamide or methacrylamide, are advantageously used concurrently in the usual small amounts, for example, from 0.01 to 5 percent by weight. They will have a beneficial effect on the product qualities under discussion, such as minimum film-forming temperature, film hardness or tackiness, or the blocking point.

The core material represents from 5 to 45 percent, and preferably from 10 to 40 percent, by weight of the total emulsion polymer, and hence amounts to the same percentage of the total monomer mixture processed.

The shell material consequently represents from 95 to 55 percent, and preferably from 90 to 60 percent, by weight of the multistage emulsion polymer, or of the monomer mixture used to produce it. A glass-transition temperature which is below 70° C. and preferably ranges from 0° to 50° C. is characteristic for the shell material. In any case, the glass transition temperature of the shell material should be at least 20K below that of the core material.

This property and the hydrophobic character of the shell material, required for the purposes of the invention, are secured through the alkyl esters of acrylic and methacrylic acid with at least four carbon atoms in the alkyl group, and optionally styrene, which predominate in its makeup. Preferred esters of this group are n-butyl acrylate and methacrylate, and 2-ethylhexyl acrylate and methacrylate. Styrene can also be used so long as the glass-transition temperature of the shell material does not exceed the limit of 70° C.; however, for the sake of achieving high weathering resistance, it is preferably used in an amount of less than 10 percent, and more particularly of less than 5 percent, by weight of the shell material. Lower alkyl esters of acrylic and/or methacrylic acid having from one to three carbon atoms in the alkyl group will impart hydrophilic properties to the shell material and therefore should not be present in an amount of more than 30 percent by weight and should preferably amount to less than 10 percent by weight.

An essential constituent of the shell material is an emulsion polymer containing carboxyl groups. The units carrying carboxyl groups should amount to at least 4 percent, and preferably to from 5 to 15 percent, by weight of the emulsion polymer produced in this stage. They are formed of ethylenically unsaturated, free-radically polymerizable carboxylic acids such as acrylic and/or methacrylic acid, maleic, fumaric or itaconic acid. Advantageously, the unsaturated carboxylic acid is nor incorporated uniformly into the shell material but added over a limited period of time during the polymerization of the monomers of a stage in an appropriately higher concentration.

The composition of the shell material preferably includes a nitrogen-containing adhesive monomer, used in an amount of from 1 to 10 percent, for example, by weight of the shell material. Among these adhesive monomers are ethylenically unsaturated, free-radically polymerizable monomers having an amino, ureido, or N-heterocyclic group, such as dialkylaminoalkyl esters and dialkylaminoalkyl amides of acrylic acid and/or methacrylic acid, and particularly those having from 1 to 5 carbon atoms in the alkyl groups, and free radically polymerizable compounds of urea, ethylene urea, or propylene urea. Compounds of this kind have the general formula

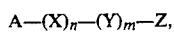

wherein:
A is $CH_2=CH-$, $CH_2=CH-CH_2-$, or $CH_2=CR'-CO-$ where R' is hydrogen or methyl;
X is $-O-$ or $-NH-$;
n is 0 or 1;
Y is a molecular chain comprising 1 to 7 atoms of carbon, or of carbon together with oxygen and/or nitrogen, particularly an alkylene chain or an alkylene chain interrupted by $-O-$, $-NH-$, or $-CO-$;
m is 0 or 1; and
Z is $-NR_2R_3$ where $R_2$ and $R_3$, taken alone, are the same or different and are methyl or ethyl, or, taken together with the nitrogen atom to which they are attached, form a pyrrolidine, piperidine, morpholine, piperazine, imidazole, pyrrolidin-(2)-one, imidazolidin-(2)-one [ethylene urea], or saturated pyrimidin-(2)-one [propylene urea] ring.

Examples of adhesive monomers of this kind are dimethylaminoethyl acrylate and methacrylate, diethylaminoethyl acrylate and methacrylate, dimethylaminopropyl acrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl) acrylamide and methacrylamide, N-(3-dimethylamino-2, 2-dimethylpropyl)acrylamide and methacrylamide, N-dimethylaminomethyl acrylamide and methacrylamide, N-dimethylaminomethyl acrylamide and methacrylamide, N-(4-morpholino-methyl) acrylamide and methacrylamide, vinylimidazole, vinylpyrrolidone, N-(2-methacryloyloxyethyl)ethylene urea, N-(2-methacryloxyacetamidoethyl)-N, N'-ethylene urea, allylalkyl ethylene urea, N-methacrylamidomethyl urea, N-methacryoyl urea, N-[3-(1, 3-diazacyclohexan-2-on-propyl] methacrylamide, 2-(1-imidazolyl)ethyl methacrylate, and 2-(1-imidazolidin-2-on)ethyl methacrylate. N-(2-methacryloyloxyethyl)ethylene urea is particularly preferred.

To prevent interfering interactions between the more or less basic adhesive monomers and the monomers containing carboxyl groups, it has proved advantageous for the shell material to consist of two phases, that is of two emulsion polymers produced in separate stages, one of which contains most or all, e.g. from 90 to 100 percent, of the ethylenically unsaturated free radically polymerizable carboxylic acid, and the other most or all, e.g. from 90 to 100 percent, of the adhesive monomer. The percentage of unsaturated carboxylic acid to be used in accordance with the invention is always based on the weight of the particular phase prepared. The phase containing the adhesive monomer is preferably prepared after the phase containing the unsaturated carboxylic acid. The quantity ratio of the two phases which together form the shell material may range from 10:1 to 1:10, for example, and preferably ranges from 2:1 to 1:2. In other respects, what has been said about the composition of the shell material applies equally to both phases.

What is the general practice in the field of emulsion polymerization may, of course, be judiciously applied also to the production of the new resin dispersions. This is true, for example, of the inclusion of specific comonomers in the composition of the core or shell material, the selection of the molecular weight or of given particle size distributions, or the adoption of known measures for improvement of the agitating stability, the pigmenting capability or the frost resistance.

Production of gloss paints

For the production of gloss paints, the dispersion is adjusted to a pH value in the alkaline range, preferably between pH 7 and pH 9, usually with ammonia. Inorganic or organic pigments are used in a pigment-volume concentration of about 5 to 30. Depending on the characteristics of the particular pigment, however, care should be taken to observe the limit above which gloss and flow are no longer satisfactory. That limit is frequently reached sooner with organic pigments than with inorganic ones. The achievable flow properties are considerably influenced by the concurrent use of so-called associative thickeners. These are aqueous dispersions of copolymers of unsaturated carboxylic acids and their alkyl and polyalkoxyalkyl esters. Suitable emulsion polymers of this type are described in U.S. Pat. No. 4,384,096, incorporated herein by reference, for example. Such thickeners may be used in an amount ranging from 1 to 10 percent by weight of the emulsion polymer contained in the vehicle of the invention. Further commonly used additives for water based gloss paints include film-forming aids, that is solvents of high boiling point for the emulsion polymer, additives for improving the water retention capability and for retarding the onset of drying, such as ethylene glycol or propylene glycol, dispersing agent such as ammonium polyacrylate, defoamers, etc.

The viscosity of the paint is adjusted with water to a value in the range from 500 to 10,000 mPa.s. The paint can be applied to the substrate to be coated by all commonly used methods such as brush coating, roller coating, spray coating, dip coating, cast coating, knife coating, or printing, in a coating thickness from 20 to 100 microns. The substrate may be metal, wood, plastic, paper, cardboard, concrete, masonry, glass, or ceramic. The adhesion to many substrates, and particularly to old alkyd based coats, is considerably improved if the shell material of the vehicle includes adhesive monomers.

Paint coats produced with the vehicles of the invention are distinguished by excellent leveling. A coat applied by brush will show no brush marks after drying. On completion of drying, the paint coats exhibit high gloss and good blocking resistance.

A better understanding of the present invention and of its many advantages will be had by referring to the following specific Examples, given by way of illustration.

EXAMPLES

(A) Production of vehicle dispersions

EXAMPLE 1

In a reaction vessel with a capacity of 2 liters, equipped with a reflux condenser, a stirrer and an inlet vessel, 0.99 g of the sodium salt of a $C_{15}$ paraffin sulfonate and 0.4 g of ammonium persulfate are dissolved in 400 g of desalted water at 20° C.

Three emulsions are successively metered into this solution at 80° C. with stirring. The first of these emulsions, added over a period of 48 minutes, is composed of
76.95 g of methyl methacrylate,
76.95 g of isobutyl methacrylate,
8.1 g of allyl methacrylate,
2.77 g of the sodium salt of $C_{15}$ paraffin sulfonate
0.24 g of ammonium persulfate, and
130.0 g of desalted water.

After a 20 minute pause, the second emulsion is metered in within 96 minutes. It is composed of
247.05 g of butyl methacrylate,
44.55 g of butyl acrylate,
32.4 g of methacrylic acid,
5.54 g of the sodium salt of $C_{15}$ paraffin sulfonate,
0.49 g of ammonium persulfate, and
260.0 g of desalted water.

After another 20 minute pause, there is added the third emulsion, composed of
247.05 g of butyl methacrylate,
44.55 g of butyl acrylate,
32.4 g of N-(2-methacryloyloxyethyl)ethylene urea,
5.54 g of the sodium salt of $C_{15}$ paraffin sulfonate,
0.49 g of ammonium persulfate, and
260.0 g of desalted water.

The batch is held for 1 hour at 80° C. and then cooled to room temperature. At 70° C., 0.66 g of 1, 4-diisopropylbenzene hydroperoxide and 0.28 g of sodium hydroxymethyl sulfinate are added. After the dispersion has been adjusted to pH 9.0, 29.7 g of octylphenoxy polyethoxyethanol (average degree of ethoxylation: 9) is added.

The dispersion is then filtered. It has a dry solids content of 45%.

EXAMPLES 2 to 4

Further dispersions are produced by the procedure described in Example 1, aqueous emulsions 1, 2 and 3 having the compositions given in Table 1 being used. The dispersion of Example 2 has a pH of 2.3.

TABLE 1

| Example | Emulsion | Polymer composition | Minimum film-forming temperature | Brookfield viscosity (mPa · s) | Particle diameter (Ωm) |
|---|---|---|---|---|---|
| 1 | 1 | A/B/E = 47.5/47.5/5 | | | |
| | 2 | C/D/F = 76.25/13.75/10 | | 5900 | 110 |
| | 3 | C/D/G = 76.25/13.75/10 | | | |

TABLE 1-continued

| Example | Emulsion | Polymer composition | Minimum film-forming temperature | Brookfield viscosity (mPa · s) | Particle diameter (Ωm) |
|---|---|---|---|---|---|
| 2 | 1 | A = 100 | | | |
|   | 2 | C/D/F = 76.25/13.75/10 | | | |
|   | 3 | C/D/G = 76.25/13.75/10 | | 8000 | 100 |
| 3 | 1 | A/E = 95/5 | | | |
|   | 2 | C/D/A/F = 55/25/10/10 | | 36500 | 90 |
|   | 3 | C/D/A/G = 55/25/10/10 | | | |
| 4 | 1 | A/E = 95/5 | | | |
|   | 2 | C/D/F = 76.25/13.75/10 | 35° C. | 7000 | 100 |
|   | 3 | C/D/G = 76.25/13.75/10 | | | |

A = Methyl methacrylate
B = Isobutyl methacrylate
C = Butyl methacrylate
D = Butyl acrylate
E = Allyl methacrylate
F = Methacrylic acid
G = N-(2-Methacryloyloxyethyl)-ethylene urea (B) Production and in-use testing of latex gloss paints Composition per 1,000 parts by weight (pbw) of the paint:
- 10 pbw of water,
- 2 pbw of ammonia, 25%,
- 5 pbw of a dispersing agent (40% dry solids content; ammonium polyacrylate),
- 4 pbw of a defoamer,
- 14 pbw of a film-forming aid (a non-water-soluble high-boiling solvent such as glycol ether acetate, or a dicarboxylic ester, e.g., Lusolvan FBH),
- 48 pbw of propylene glycol (to extend the pot life and to improve the water-retention capability), and
- 215 pbw of titanium dioxide, rutile form.

The mixture is dispersed for 20 minutes at 4,500 rpm. Then there are added:

617 pbw of the dispersion of Examples 1 to 5, and
85 pbw of an associative thickener based on an acrylic resin with a 10% polymer content.

By adding water, the paint is adjusted to a viscosity of from 500 to 10,000 mPa.s. The pigment-volume concentration has to be based on the nature of the pigment, bearing in mind that organic pigments give lower gloss than inorganic pigments.

For determination of the blocking point, a sheet of weakly absorbent paper is coated by means of a ruler with a layer 0.1 mm thick of the paint and dried for 8 hours at 60° C. The paper is cut into strips measuring 2.5×17 cm, which are folded in the middle so that the coated sides are in contact with each other and then subjected to a load of 50 g/cm² for 1 hour while the temperature is being raised incrementally. The temperature at which the coated strips can just barely be separated from each other without damage to their surfaces is deemed to be the blocking point.

The latex paints are applied in a dry film thickness of between 50 and 70 microns to a PVC sheet coated with a commercial alkyd varnish and dried for 7 days at 23° C. and 50% relative humidity.

The coating is tested for adhesive strength by the grid-cut test in conformity with DIN 53,151. The test conditions are made still more stringent by applying an adhesive tape to the surface undergoing testing and then pulling it off in one quick motion. The value so determined is deemed to be the dry adhesion.

For determination of the so-called wet adhesion, the grid-cut test in conformity with DIN 53,151 is carried out after cyclic stressing by immersion in water at 23° C. for 8 hours followed by cold storage at −20° C. for 16 hours. When no blistering and no flaking of the paint is discernible after five such cycles, the grid-cut test is performed in both the still-swollen state and the dry state.

The test results are presented in Table 2.

TABLE 2

| Example | Gloss* % | Blocking point °C. | Dry adhesion | Leveling (assessed visually) | Wet adhesion Blistering | Wet adhesion Flaking | Grid-cut test** Dry | Grid-cut test** Wet |
|---|---|---|---|---|---|---|---|---|
| 1 | 81 | 80–90 | 0/0 | Very good | None | None | 0/0 | 0/0 |
| 2 | — | 70 | — | Very good | — | — | — | — |
| 3 | 78 | 70–90 | 0/0 | Very good | None | None | 0/0 | 0/0 |
| 4 | 79 | 70–80 | 0/0 | Very good | None | None | 0/0 | 0/0 |

*Gardner gloss-measuring instrument; measuring angle 60 deg.
**Evaluation of grid-cut test: The first digit rates the adhesive strength on a declining scale from 0 to 4. The second digit similarly rates the adhesion after an adhesive tape has been applied and then pulled off.

EXAMPLE 5

An emulsion polymer free of any adhesive monomer is prepared according to Example 4, but a mixture of 85 percent by weight of butyl methacrylate and 15 percent by weight of butyl acrylate is used in Emulsion 3 of that Example.

Coating test such as in Example 4 were carried out to test the coating. The dry adhesion showed a slight deficiency with a value of 0/2. In testing for wet adhesion, a light formation of blisters was determined.

EXAMPLE 6

An emulsion polymer containing vinyl imidazole as an adhesive monomer was prepared according to Example 4 but using a monomer mixture of 76.25 percent of wight of butyl methacrylate, 13.75 percent of butyl acrylate, and 10 percent of vinyl imidazole in Emulsion 3.

The dry adhesion of a coat prepared therefrom was 0/1. The wet adhesion was as in Example 4.

EXAMPLE 7

An emulsion polymer containing a non-nitrogenous adhesive monomer, acetoacetoxyethyl methacrylate (AAEM), was prepared as in Example 4, but using the following monomer emulsions (compositions in parts by weight):

Emulsion 1, A/E, 95 / 5
Emulsion 2, C/D/F, 77.5 / 13.75 / 8.75
Emulsion 3, C/D/AAEM, 57.5 / 32.5 / 10.

The total monomers employed were distributed in Emulsions 1, 2, and 3 in a weight ratio of 20:40:40. The average particle size of the latex particles was 105 nanometers. The viscosity of the latex was 72 mPa.s. Its pH was 8.9.

Coating tests were carried out as for the other Examples to test the coating. The gloss, flow, dry- and wet-adhesion, and blocking point of the coating were all judged to be very good.

EXAMPLE 8

Example 6 is repeatet, however Emulsion 3 having a monomer composition (in percent b.w.)

76.25 % of n-butyl methacrylate
21.75 % of n-butyl acrylate
2.0 % of N-(3-dimethylamino-2, 2-dimethylpropyl)-methacrylate acetic acid salt The coating prepared from this emulsion had flow properties and wet- and dry- adhesion falling between the values reported for the materials of Examples 5 and 6.

What is claimed is:

1. A vehicle or binder for water based gloss paints consisting of an aqueous phase and, dispersed therein, particles of a multiphase emulsion polymer having an average particle diameter less than 200 nanometers and comprising
   (a) a polymeric core having a glass transition temperature greater than 40° C. and
   (b) a polymeric shell having a glass transition temperature less than 70° C. and at least 20 Centigrade degrees below that of said polymeric core, said shell including an emulsion polymer containing at least 4 percent by weight of polymerized units of an ethylenically unsaturated free radically polymerizable carboxylic acid monomer and more than 80 percent by weight of polymerized units of at least one monomer selected from the group consisting of styrene and alkyl esters of acrylic acid and methacrylic acid having at least 4 carbon atoms in the alkyl group.

2. A vehicle as in claim 1 wherein said polymeric shell includes polymerized units of an adhesive monomer.

3. A vehicle as in claim 2 wherein said adhesive monomer is a nitrogenous monomer.

4. A vehicle as in claim 2 wherein said polymeric shell consists of two emulsion polymers, one of which contains a major portion of said units of carboxylic acid monomer and the other of which contains a major portion of said units of adhesive monomer.

5. A vehicle as in claim 3 wherein said nitrogenous adhesive monomer is an ethylenically unsaturated free radically polymerizable monomer comprising an amino, ureido, or N-hetercyclic group.

* * * * *